United States Patent
Heingl et al.

(10) Patent No.: US 12,504,079 B2
(45) Date of Patent: Dec. 23, 2025

(54) VALVE FOR REGULATING AND/OR CONTROLLING MASS FLOWS

(71) Applicant: SOLERO TECHNOLOGIES VILLINGEN GMBH, Villingen-Schwenningen (DE)

(72) Inventors: Ralf Heingl, Villingen-Schwenningen (DE); Martin Ohnmacht, Fluorn-Winzeln (DE); Stefan Disch, Schonach (DE); Reiner Stimmler, Leonberg-Warmbronn (DE)

(73) Assignee: Solero Technologies Villingen GMBH, Villingen-Schwenningen (DE)

( * ) Notice: Subject to any disclaimer, the term of this patent is extended or adjusted under 35 U.S.C. 154(b) by 0 days.

(21) Appl. No.: 18/574,227

(22) PCT Filed: Jun. 23, 2022

(86) PCT No.: PCT/EP2022/067211
§ 371 (c)(1),
(2) Date: Dec. 26, 2023

(87) PCT Pub. No.: WO2022/268972
PCT Pub. Date: Dec. 29, 2022

(65) Prior Publication Data
US 2024/0318728 A1   Sep. 26, 2024

(30) Foreign Application Priority Data
Jun. 25, 2021 (DE) .......................... 102021116464.8

(51) Int. Cl.
*F16K 1/28* (2006.01)
*F16K 31/06* (2006.01)

(52) U.S. Cl.
CPC ............ *F16K 1/28* (2013.01); *F16K 31/0675* (2013.01)

(58) Field of Classification Search
CPC .............................. F16K 1/36; F16K 31/0655
See application file for complete search history.

(56) References Cited

U.S. PATENT DOCUMENTS

| | | | | |
|---|---|---|---|---|
| 3,211,418 A | * | 10/1965 | Klinger-Lohr | F16K 1/36 251/187 |
| 3,557,837 A | * | 1/1971 | Giwosky | F16K 1/36 137/630.14 |

(Continued)

FOREIGN PATENT DOCUMENTS

| | | |
|---|---|---|
| CN | 107166048 B | 9/2017 |
| DE | 102012204565 A1 | 9/2013 |

(Continued)

OTHER PUBLICATIONS

Office Action issued Dec. 13, 2024, in parallel pending European patent application No. 22 734 971.9.

*Primary Examiner* — Kelsey E Cary
(74) *Attorney, Agent, or Firm* — Nath, Goldberg & Meyer; Jerald L. Meyer; Stanley N. Protigal

(57) ABSTRACT

A valve (1, 2) is provided with a movable closing element (16, 116), with a nozzle body (32) with a passage opening (26), as well as a valve seat (25) surrounding the passage opening (26), and with an elastic sealing element (27, 127) which is movable with the movable closing element (16, 116), in order to close or open the valve seat (26), in which, at least when the valve seat (26) is open, a gap (29, 129) is present between at least one section (27a, 127a) of the elastic sealing element (27, 127) and a section (16a, 116a) of the movable closing element (16, 116) lying opposite thereto.

16 Claims, 2 Drawing Sheets

(56) References Cited

U.S. PATENT DOCUMENTS

| | | | |
|---|---|---|---|
| 5,209,455 A | 5/1993 | Uetsuhara et al. | |
| 2010/0078084 A1* | 4/2010 | Zuck | F16K 43/008 |
| | | | 251/205 |
| 2011/0175004 A1* | 7/2011 | Duerr | F16K 1/12 |
| | | | 251/129.01 |
| 2017/0152958 A1* | 6/2017 | Akamatsu | F16K 1/36 |
| 2017/0350512 A1* | 12/2017 | Bertrand | F16K 31/0655 |
| 2019/0085999 A1* | 3/2019 | Chen | F16K 31/0655 |
| 2019/0138036 A1* | 5/2019 | Ohnmacht | F16K 31/0655 |
| 2020/0355291 A1* | 11/2020 | Inoue | F16K 1/36 |
| 2020/0378527 A1* | 12/2020 | Stephan | F16K 1/36 |
| 2022/0003324 A1* | 1/2022 | Hosokawa | F16K 1/38 |
| 2022/0390028 A1* | 12/2022 | Cole | F16K 31/0655 |
| 2023/0375066 A1* | 11/2023 | Higashidozono | F16K 1/36 |

FOREIGN PATENT DOCUMENTS

| | | | | |
|---|---|---|---|---|
| JP | 2007218280 A | 8/2007 | | |
| WO | 2012/008202 A1 | 1/2012 | | |
| WO | WO-2020091037 A1 * | 5/2020 | | F16K 1/36 |

* cited by examiner

VALVE FOR REGULATING AND/OR CONTROLLING MASS FLOWS

CROSS-REFERENCE TO RELATED APPLICATIONS

This is a National Phase Application filed under 35 U.S.C. 371 as a national stage of PCT/EP2022/067211, filed Jun. 23, 2022, an application claiming the benefit of German Application No. 102012116464.8 filed Jun. 25, 2021, the content of each of which is hereby incorporated by reference in its entirety.

FIELD

The invention relates to a valve for regulating and/or controlling mass flows with the features of the generic term of claim 1. A passage opening which is surrounded by a valve seat is provided in such a valve. An elastic sealing element is furthermore provided, which can be moved by a closing element between a closed position, in which it closes the valve seat, and at least one open position, in which it releases the valve seat.

BACKGROUND

A critical point with such valves is their imperviousness in the closed position. In the state of the art, this is generally brought about by the elastic sealing element being bonded or vulcanized to the closing element on the end face and being pressed against the valve seat by the closing element in the closed position, as can, for example, be seen in DE 10 2012 204 565 A1.

However, practice shows that the success of this approach depends critically on the valve seat being oriented with sufficient accuracy perpendicular to the axis of the movement of the closing element. If there is a tilting of the closing element, the sealing element is no longer pressed evenly against the valve seat, which leads to leakage flows. The procedure described therefore places high demands on the manufacturing process, which can often not be realized with low-cost mass production methods or only by accepting considerable reject rates.

SUMMARY

The task of the invention is therefore to provide a solenoid valve for regulating and/or controlling mass flows which has an improved tolerance to tilting of the valve seat relative to the axis of movement of the closing element. This task is solved by a solenoid valve in which a movable closing element is supported by a compression spring such that it presses an elastic sealing element against a valve seat when the valve is closed.

The valve according to the invention has a movable closing element, a nozzle body with a passage opening and with a valve seat surrounding the passage opening, and a resilient sealing element which is movable together with the movable closing element in order to close or open the valve seat.

It is essential to the invention that, at least when the valve seat is open, there is a gap between sections of the elastic sealing element and opposite sections of the movable closing element. The gap does not necessarily need to be a constant gap dimension, but rather the distance between the corresponding sections of the movable closing element and the elastic sealing element can vary; that which is essential is that there is a clearance or an empty volume between these sections. Preferably, the gap is present between sections of the elastic sealing element and opposite sections of the movable closing element, which extend from the edge of the elastic sealing element towards its center.

This measure allows the elastic sealing element to deform, which leads to an effective compensation of the previously occurring negative effects of a tilting of the valve seat relative to the direction of movement of the movable closing element. This effect can be optimized by selecting the material parameters, in particular the hardness of the elastic closing element, which can consist, for example, of a fluoroelastomer rubber, and the width of the gap.

It is particularly preferable when the valve seat is formed by a projection and that the elastic sealing element covers the projection in order to close the valve seat. With an appropriately selected contact pressure, the projection forming the valve seat is pressed into and is virtually embedded in the elastic material from which the elastic sealing element is made, such that the entire surface of the projection is in close contact with the elastic sealing element. This significantly improves the sealing effect compared to configurations in which an elastic sealing element only interacts with a wall surface, for example, the inner wall, of a valve seat.

The elastic sealing element can, in particular, be arranged on an end face of the movable closing element facing the valve seat, which results in a simple construction.

In order to further optimize the possibility of compensating for tilting by the elastic sealing element, it has proven to be particularly advantageous if the elastic sealing element is arranged with a pin on the movable closing element. The elastic sealing element can, in particular, then be configured in a ring-shaped manner and be attached to the end face of the movable closing element with a pin that passes through the center of the ring, which leads to a noticeable improvement compared to two-dimensional, material-locking connections.

On the other hand, it can be very efficient in terms of manufacturing technology if the elastic sealing element is vulcanized directly onto the movable closing element.

The gap can be formed at least partially by a step or recess on the side of the elastic sealing element facing the movable closing element, which is to say, a local weakening of the elastic sealing element, which facilitates, for example, its adaptation by bending.

Alternatively, or additionally, the gap can be formed at least partially by a step or recess on the side of the movable closing element facing the elastic sealing element.

A particularly preferred arrangement is one in which, when the valve seat is open, at least sections of the surface of the elastic sealing element facing the closing element, which are opposite the sections of the surface of the elastic sealing element facing the valve seat that are in contact with the latter when the valve seat is closed, are at a distance from the surface of the end face of the closing element facing the elastic sealing element. This arrangement facilitates the adaptation of the shape of the elastic sealing element when closing a tilted valve seat in a particularly effective manner. In such a configuration, the gap can also be formed by an annular circumferential groove.

One category of valves for which the invention is particularly suitable are solenoid valves with solenoid coil, pole core, and armature. In this case, the closing element can be formed directly by the armature of the solenoid valve.

A particular relevance of the invention for such valves, in terms of manufacturing technology, lies in the fact that it is possible to assemble them from components which, in particular, comprise a plastic overmolded subassembly which contains at least the solenoid coil and pole core, and to then arrange the armature with the elastic sealing element arranged on it in this assembly as the closing element and finally to fit the passage opening with the valve seat surrounding it as a further component in the form of a cover. The problem with this cost-effective and efficient manufacturing method, is, however, that a precise orientation, relative to each other, of the valve seat and the direction of movement of the closing element can only be achieved with a great deal of effort, a problem which is rendered obsolete by the improvement in tolerance to such tilting achieved by the invention.

A particularly good sealing of the valve seat can be achieved if the closing element is supported by a compression spring.

BRIEF DESCRIPTION OF THE DRAWINGS

The invention is elucidated in more detail below with the aid of figures showing embodiment examples. Wherein:

FIG. 2b: shows a sectional enlargement from FIG. 2a.

DETAILED DESCRIPTION

Figure 1A:
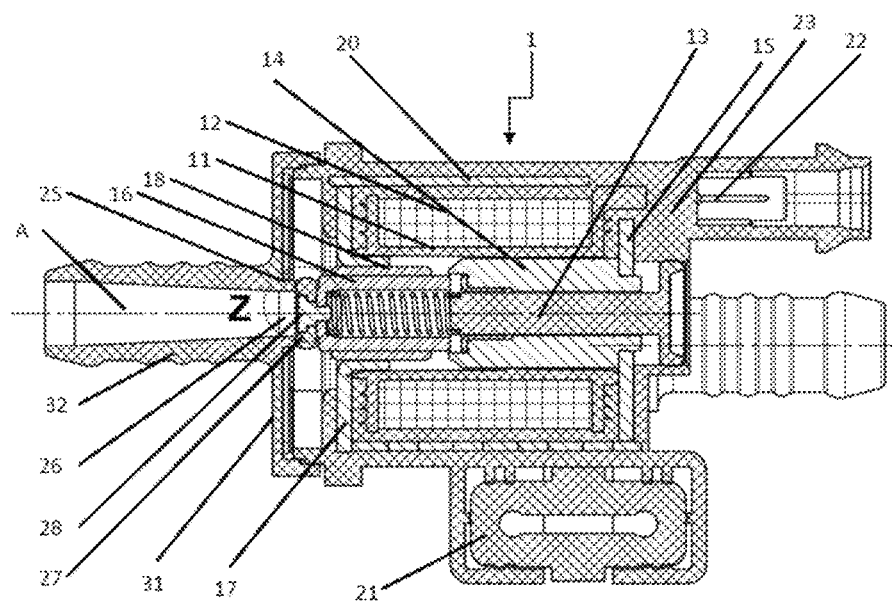
FIG. 1a: shows a cross-sectional view of a first embodiment configured as a solenoid valve.

The valve 1 shown in FIG. 1a is a solenoid valve. The solenoid coil is formed by a winding 12 wound on an essentially hollow cylindrical winding support 11. A guide 13, on which a pole core 14 is arranged and which is supported on a cover 15, protrudes into the interior of the essentially hollow cylindrical winding support 11.

Figure 2A:
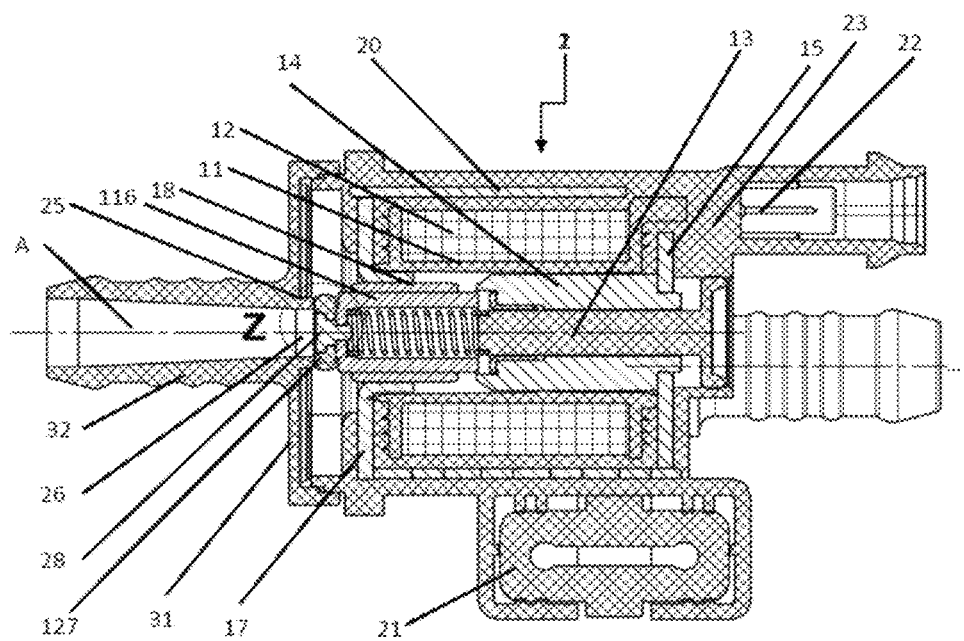

A movable closing element 16 formed by the armature of the solenoid valve, which is designated by reference sign 116 in the embodiment example shown in FIG. 2a, is mounted in a bushing 18 centered by a flange 17 so that it can be moved along the axis A. The closing element 16 formed by the armature is supported on the guide 13 by means of a compression spring 19.

Cover 15, flange 17, and a tubular-shaped housing 20, which surrounds the solenoid coil in the radial direction, are combined by means of an overmolding 23 made of plastic to form a first assembly with a coupling 21 for mechanical fastening and a contact section 22 to create an electrical connection for supplying current to the solenoid coil. The compression spring 19 and the closing element 16 supported by it and formed by the armature can be inserted into the bushing 18 by overmolding during the manufacture of the valve 1 after the first assembly has been manufactured.

A second assembly, which forms the nozzle body 32, comprises, in particular, a supply line 24, a passage opening 26 surrounded by a valve seat 25 configured in the form of an annular projection and a cover section 31, which cover section overlaps the end face of the first assembly on which the closing element 16 is located. It can also be manufactured of plastic, for example by injection-molding, and is attached to the second assembly, for example through adhesion and/or latch or snap fastening.

In the embodiment shown, an elastic sealing element 27 is attached to the end face of the side of the closing element 16 formed by the armature facing the valve seat 25, which is brought into contact with the valve seat 25 in such a way that it covers the valve seat 25 and, in particular, the sections 27b are in contact with the valve seat 25. In addition, the compression spring 19 is compressed during this process, such that the elastic sealing element 27 is pressed against the valve seat 25 by the spring force when the solenoid coil is not energized and closes it. In the embodiment from FIG. 2a, this elastic sealing element is designated by the reference sign 127.

The solenoid coil is energized to open the valve 1, which causes the armature and thus the movable closing element 16 formed by it to open.

Figure 1B:
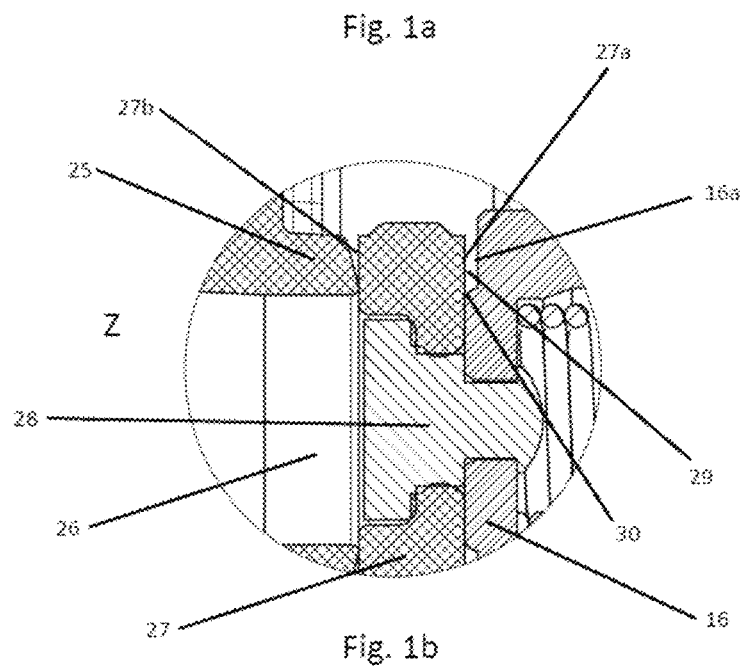
FIG. 1b: shows a sectional enlargement from FIG. 1a, FIG. 2a: shows a cross-sectional view of a second embodiment example in the form of a solenoid valve.

As can be seen, in particular, in the enlarged representation according to FIG. 1b, in the embodiment example shown, the annular elastic sealing element 27 arranged on the end face of the movable closing element 16 formed by the armature is fastened with a pin 28, whereby more compensating movements are possible than with a bonded elastic sealing element 27. In principle, however, it is also possible in an embodiment not shown to vulcanize the annular elastic sealing element directly onto the armature or onto the movable closing element 16.

It can, moreover, be seen that there is a gap 29 between section 27a of the annular elastic sealing element 27 and section 16a of the movable closing element 16 formed by the armature, which is located opposite to it. In this embodiment example, the gap 29 is created by a step 30 on the end face of the movable closing element 16, which is formed by a recess that causes section 16a of the movable closing element 16 to spring back.

Figure 2B:
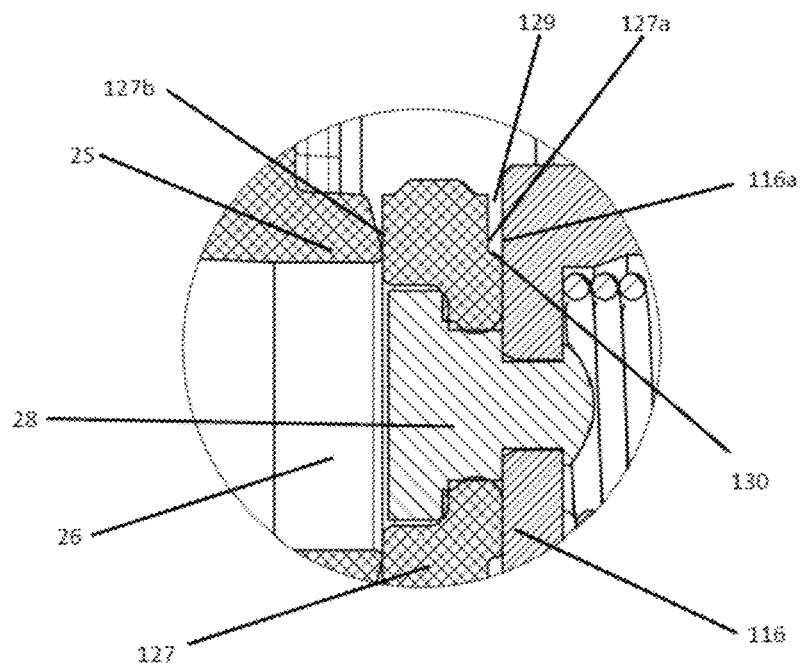

The only differences between the embodiment example according to FIG. 2a and the embodiment example according to FIG. 1a lie in the shape of the elastic sealing element 127, the end face of the closing element 116 formed by the armature and the gap 129 ultimately created by the step 130, which can be seen particularly clearly in FIG. 2b. For this reason, only these components are marked with different reference signs than in FIG. 1a and FIG. 1b, whereas the other components of the valve 2 according to FIG. 2a and FIG. 2b are marked with the same reference signs as in FIG. 1a and FIG. 1b. For the description of the basic construction of valve 2 with regard to the identically marked components, reference can be made directly to the description of valve 1 in FIG. 1a and FIG. 1b, in which information is also partially provided on the designation of the corresponding components in the embodiment shown in FIG. 2a.

As can be seen from FIG. 2b, the annular elastic sealing element 127 arranged on the end face of the movable closing element 116 formed by the armature is also attached to the valve 2 with a pin 28, whereby more compensating movements than with a bonded elastic sealing element 127 are enabled. It can, moreover, be seen that there is also a gap 129 between the section 127a of the annular elastic sealing element 127 and the section 116a of the movable closing element 16 formed by the armature, which lies opposite to it. In this embodiment example, the gap 129 is, however, created by a step 130 on the side of the elastic sealing element 127 facing the movable closing element 116, which step is created by a recess that causes section 127a of the elastic sealing element 127 to spring back.

LIST OF REFERENCE SIGNS 1, 2 valve
11 winding support
12 winding
13 guide
14 pole core
15 cover 16, 116 movable closing element
16a, 116a section
17 flange
18 bushing
19 compression spring
20 housing
21 coupling
22 contact section
23 overmolding
24 supply line
25 valve seat
26 passage opening
27, 127 elastic sealing element
27a, 27b, 127a, 127b section
28 pin
29, 129 gap
30, 130 step
31 cover section
32 nozzle body
A axis

The invention claimed is:

1. A valve (1, 2) comprising:
a movable closing element (16, 116);
a nozzle body (32) with a passage opening (26) as well as a valve seat (25) surrounding the passage opening (26);
an elastic sealing element (27, 127) which is movable with the movable closing element (16, 116) in order to close or open the valve seat (26); and
a compression spring;
characterized in that at least wherein, when the valve seat (26) is open, a gap (29, 129) is present between at least one section (27a, 127a) of the elastic sealing element (27, 127) and a section (16a, 116a) of the movable closing element (16, 116) opposite thereto,
wherein the gap (129) is at least partially formed by a step (130) or recess on a side of the elastic sealing element (127) facing the movable closing element 15 (116),
wherein the gap is present between sections of the elastic sealing element (27, 127) and opposite sections of the movable closing element (16, 116), which extend from an edge of the elastic sealing element (27, 127) towards its center,
and wherein the movable closing element (16, 116) is supported by the compression spring (19) such that it presses the elastic sealing element (27, 127) against the valve seat (25) when the valve (1, 2) is closed.

2. The valve (1, 2) according to claim 1, wherein the valve seat (25) is formed by a projection and in that the elastic sealing element (27, 127) covers the projection in order to close the valve seat (25).

3. The valve (1, 2) according to claim 1, wherein the elastic sealing element (27, 127) is arranged on an end face of the movable closing element (16, 116) facing the valve seat (25).

4. The valve (1, 2) according to claim 3, wherein the elastic sealing element (27, 127) is arranged with a pin (28) on the movable closing element (16, 116).

5. The valve (1, 2) according to claim 3, wherein the elastic sealing element is vulcanized directly onto the movable closing element (16, 116).

6. The valve (1, 2) according to claim 1, wherein when the valve seat (25) is open, the sections (27a, 127a) of a surface of the elastic sealing element (27, 127) facing the closing element (16, 116), which are opposite the sections (27b, 127b) of a surface of the elastic sealing element (27, 127) facing the valve seat (25), which are in contact with the valve seat (25) when the valve seat (25) is closed, are at a distance from a surface of an end face of the closing element (16, 116) facing the elastic sealing element (27, 127).

7. The valve (1, 2) according to claim 1, wherein the valve is a solenoid valve with solenoid coil, pole core (14), and armature.

8. The valve (1, 2) according to claim 7, wherein the movable closing element (16, 116) is formed by the armature of the solenoid valve.

9. A valve (1, 2) comprising:
a movable closing element (16, 116);
a nozzle body (32) with a passage opening (26) as well as a valve seat (25) surrounding the passage opening (26);
an elastic sealing element (27, 127) which is movable with the movable closing element (16, 116) in order to close or open the valve seat (26),
wherein, at least when the valve seat (26) is open, a gap (29, 129) is present between at least one section (27a, 127a) of the elastic sealing element (27, 127) and a section (16a, 116a) of the movable closing element (16, 116) opposite thereto,
wherein the gap (29) is at least partially formed by a step (30) or recess on a side of the movable closing element (16) facing the elastic sealing element (27),
wherein the gap is present between sections of the elastic sealing element (27, 127) and opposite sections of the movable closing element (16, 116), which extend from an edge of the elastic sealing element (27, 127) towards its center,
and wherein the movable closing element (16, 116) is supported by a compression spring (19) such that it presses the elastic sealing element (27, 127) against the valve seat (25) when the valve (1, 2) is closed.

10. The valve (1, 2) according to claim 9, wherein the valve seat (25) is formed by a projection and in that the elastic sealing element (27, 127) covers the projection in order to close the valve seat (25).

11. The valve (1, 2) according to claim 9, wherein the elastic sealing element (27, 127) is arranged on an end face of the movable closing element (16, 116) facing the valve seat (25).

12. The valve (1, 2) according to claim 11, wherein the elastic sealing element (27, 127) is arranged with a pin (28) on the movable closing element (16, 116).

13. The valve (1, 2) according to claim 11, wherein the elastic sealing element is vulcanized directly onto the movable closing element (16, 116).

14. The valve (1, 2) according to claim 9, wherein when the valve seat (25) is open, the sections (27a, 127a) of a surface of the elastic sealing element (27, 127) facing the closing element (16, 116), which are opposite the sections (27b, 127b) of a surface of the elastic sealing element (27, 127) facing the valve seat (25), which are in contact with the valve seat (25) when the valve seat (25) is closed, are at a distance from a surface of an end face of the closing element (16, 116) facing the elastic sealing element (27, 127).

15. The valve (1, 2) according to claim 9, wherein the valve is a solenoid valve with solenoid coil, pole core (14), and armature.

16. The valve (1, 2) according to claim 15, wherein the movable closing element (16, 116) is formed by the armature of the solenoid valve.

* * * * *